D. BEST.
BLUE ROCK TRAP.
APPLICATION FILED JULY 25, 1913.
1,093,524.
Patented Apr. 14, 1914.
2 SHEETS—SHEET 1.
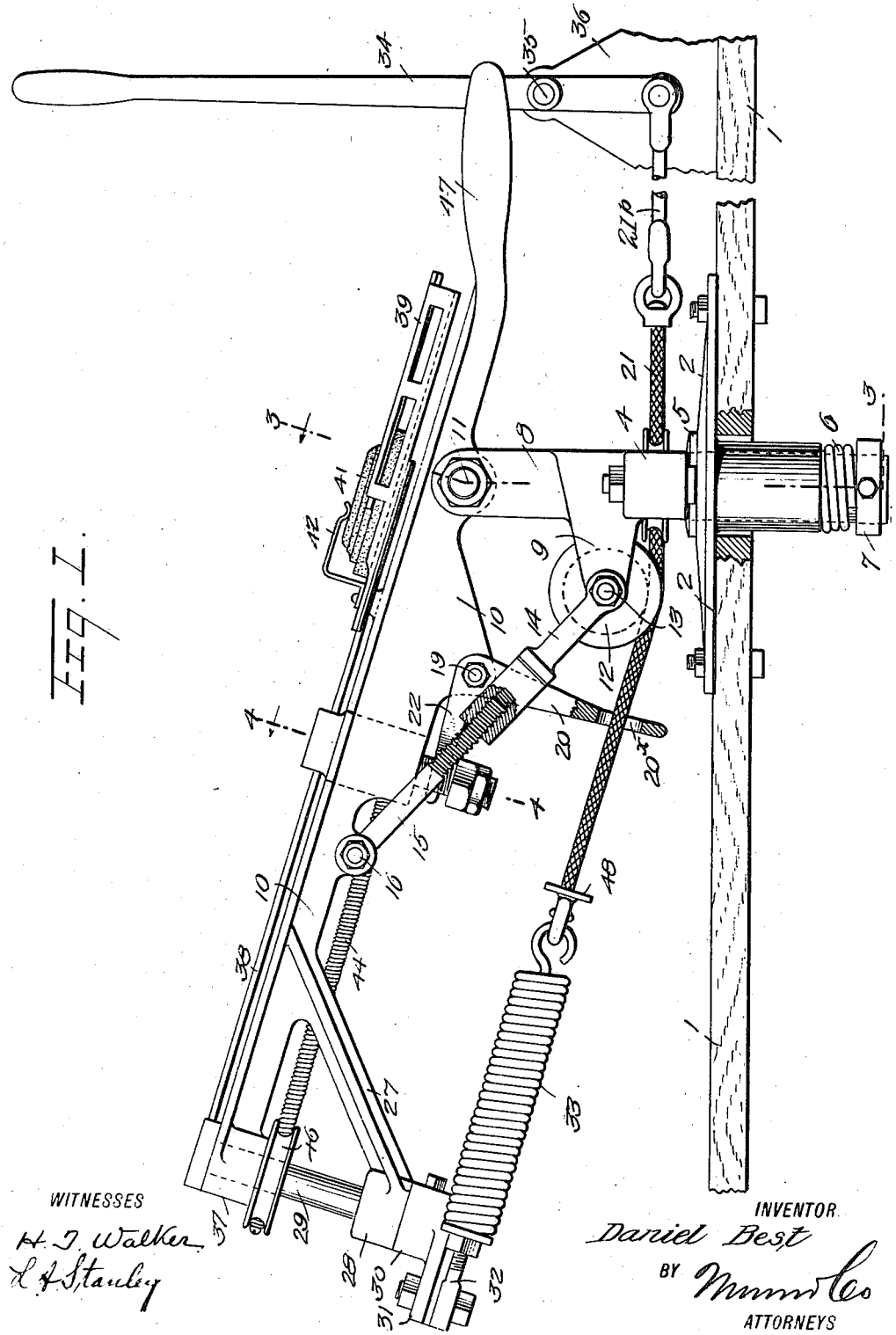
WITNESSES
H. J. Walker
L. A. Stanley
INVENTOR
Daniel Best
BY Munn & Co
ATTORNEYS

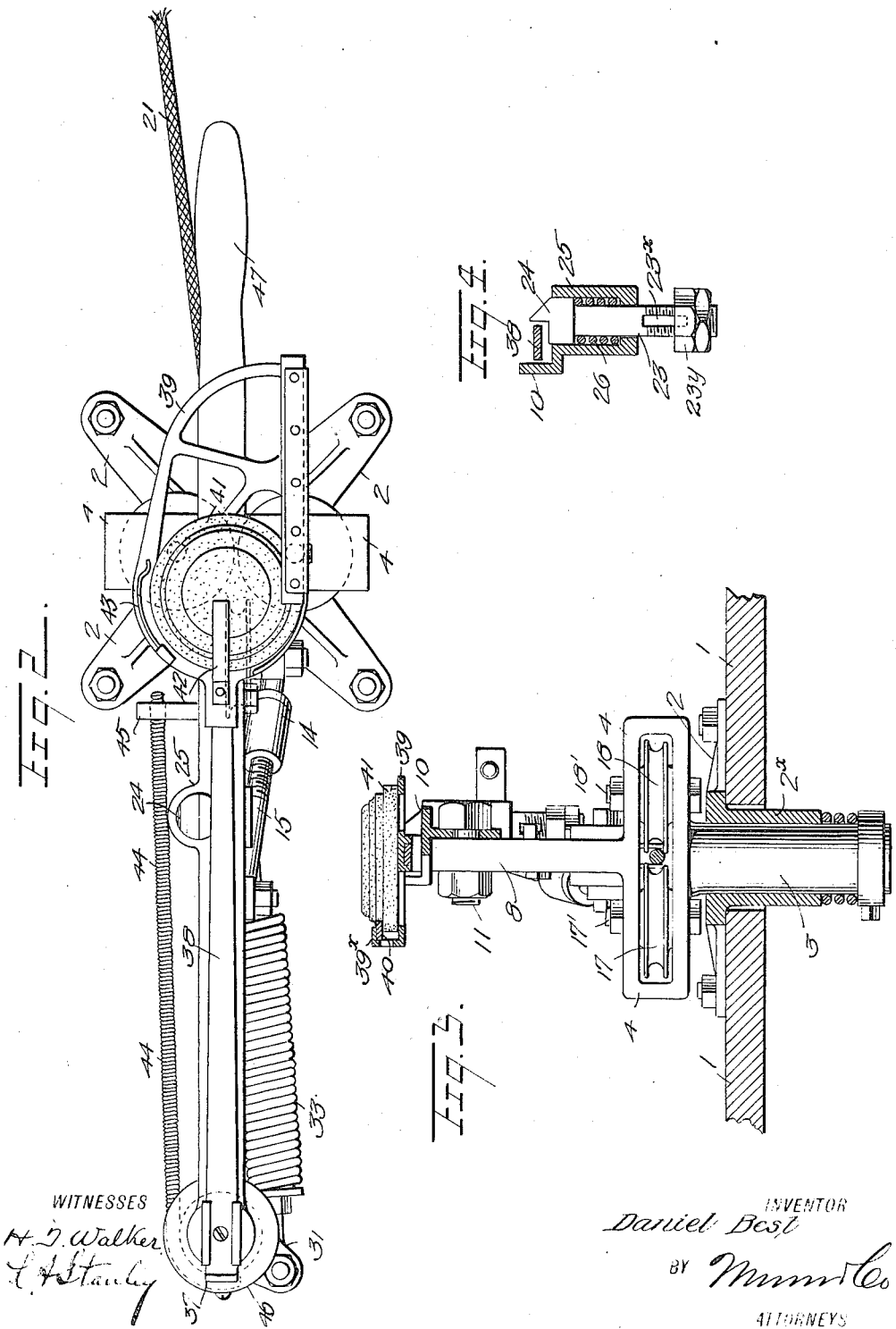

UNITED STATES PATENT OFFICE.

DANIEL BEST, OF SAN LEANDRO, CALIFORNIA.

BLUE-ROCK TRAP.

1,093,524.   Specification of Letters Patent.   Patented Apr. 14, 1914.

Application filed July 25, 1913. Serial No. 781,130.

*To all whom it may concern:*

Be it known that I, DANIEL BEST, a citizen of the United States, and a resident of San Leandro, in the county of Alameda and State of California, have made certain new and useful Improvements in Blue-Rock Traps, of which the following is a specification.

My invention relates to improvements in traps for throwing blue rocks and it consists in the combinations, arrangements and constructions herein described and claimed.

An object of my invention is to provide a device having a frame which may be turned at any angle of the field, without causing extra strain, or having a tendency to pull the frame out of position.

A further object of my invention is to provide a device in which the rocks are caused to spin and in which the throwing arm is automatically brought back into position ready for another throw.

Other objects and advantages will appear in the following specification and the novel features of the invention will be particularly pointed out in the appended claims.

My invention is illustrated in the accompanying drawings forming part of this application in which—

Figure 1 is a side view of the device, Fig. 2 is a plan view thereof, Fig. 3 is a section along the line 3—3 of Fig. 1, and Fig. 4 is a section along the line 4—4 of Fig. 1.

In carrying out my invention I make use of a base 1 which may be a floor or other suitable foundation. Mounted upon the floor is a base plate 2 having a socket $2^x$ arranged to receive a standard 3 which bears the main frame 4. The latter is provided with a plate 5 which rests upon the base 2 and which is held upon the latter by means of a spring 6 on the standard 3, which bears against a collar 7 at the end of the standard. The frame 4 has an upright 8 which bears a laterally extending arm 9. At the upper end of the upright 8 is pivotally secured a carrier frame 10 which is designed to tilt on a pivot bolt 11. A pulley 12 is mounted on a pivot 13 carried by the laterally extending arm 9. Pivotally secured to the pivot 13 is an arm 14 which is threaded internally at one end to receive the threaded end of an arm 15 which is pivotally connected at 16 to the carrier frame 10. The frame 4 is slotted to admit the pulleys 17 and 18 which are mounted on vertical axes 17' and 18' respectively. Pivotally mounted at 19 on the carrier frame 10 is a trigger arm in the shape of a bell crank lever the arm 20 of this lever being perforated, as shown at $20^x$ to provide a passage for a cable 21, and the other arm 22 being arranged to enter an elongated opening $23^x$ in a trigger shank 23 (see Fig. 4), which is arranged to slide in a housing 25 formed by a portion of the frame 10, a spring 26 being provided for normally holding the trigger in an upper position. The trigger shank 23 is threaded as shown in Fig. 4 and bears an adjustable nut $23^y$ and a locking nut $23^z$. Secured to the frame 10 is a brace member 27 which has an integral bearing 28 for the crank shaft 29. The latter is provided with a collar 30 having an arm 31 which is pivotally connected by means of the link 32 with a spring 33. The latter is attached to the cable 21 which passes through the trigger arm 20, thence underneath the pulley 12, thence between the pulleys 17 and 18 being attached to the lower end of the operating lever 34 which is mounted at 35 on a bracket 36 secured to the base 1, by means of a pipe $21^p$.

The upper part of the crank shaft 29 bears a collar 37 which has an arm 38 to which the rock carrier 39 is secured. The latter is in the shape shown in Fig. 2. It is provided on one edge with a flange $39^x$ U-shaped in section and having a resilient strip 40 arranged to receive the flanged edge of a portion of the rock 41. Springs 42 and 43 are provided for holding the rock in position on the carrier. A spring 44 is secured at one end to an arm 45 carried by the frame 10 and passes partly around and is secured to a grooved wheel 46 which is fastened on the crank shaft 29.

From the foregoing description of the various parts of the device, the operation thereof will be readily understood. The rock carrier frame may be swung laterally so as to throw the rock at various angular positions by means of the handle 47. By adjusting the threaded arm 15 with respect to the arm 14 the carrier frame may be elevated at any desired angle. With the arm in the position shown in Fig. 1, it is only necessary to pull the operating handle 34, thereby stretching the spring 33. When the lug 48 reaches the arm 20 of the trigger it will cause the bell crank lever to pull downwardly on the trigger shank 23 (see Fig. 4), thereby releasing the arm 38. Under the influence of the spring 33 the arm and the carrier attached to it will be given a rotary movement around the axis of the crank shaft 29. As the arm and carrier swing around the tension on the spring 44 will be increased and the arm will be brought to a stop, thus throwing the rock which as stated before receives a spinning motion from its engagement with the resilient strip $39^x$. Under the influence of the spring 44 the arm will be returned to its initial position (the lever 34 being released in the meantime) and it will swing backwardly, being held by the trigger 24. The trap is now ready for throwing another rock which may be placed upon the carrier.

The force with which the rock may be thrown can be regulated by means of the nuts $23^y$ and $23^z$ on the trigger shank 23. It will be observed that when these nuts are screwed toward the end of the bell-crank lever which projects through the slot $23^x$ the trigger will be operated sooner than it would be if the nuts were screwed in the opposite direction. Now as the spring 33 is constantly increasing its tension the farther it is moved, it will be apparent that greater or less force will be exerted on the throwing arm, dependent upon the moment the trigger is actuated. If the rock is to be thrown against the wind it will require more power than if it is thrown with the wind or in calm weather and by manipulating the adjusting nuts $23^y$ and $23^z$ the proper tension for throwing the rock may be easily attained.

I claim:

1. In a blue rock trap, a base, a main frame rotatably mounted thereon on a vertical axis, a carrier frame mounted on said main frame on a horizontal axis, a crank shaft rotatably carried by said carrier frame at one end thereof, an arm secured to said crank shaft, a rock carrier mounted on said arm, a trigger carried by said main frame for holding said arm in operative position, a spring for exerting tension on said crank shaft, an operating handle, a cable secured to said operating handle at one end and to said spring at the other, movable means carried by said frame and arranged to engage said trigger for operating the latter, means carried by said trigger for regulating the time of engagement by said movable means, and means carried by said cable for actuating said movable means.

2. In a blue rock trap, a base, a main frame rotatably mounted thereon on a vertical axis, a carrier frame mounted on said main frame on a horizontal axis, a crank shaft rotatably carried by said carrier frame at one end thereof, an arm secured to said crank shaft, a rock carrier mounted on said arm, a trigger carried by said main frame for holding said arm in operative position, a spring for exerting tension on said crank shaft, an operating handle, a cable secured to said operating handle at one end and to said spring at the other, a bell-crank lever pivotally mounted on said main frame, one end of said bell-crank lever being arranged to engage said trigger for operating the latter, means carried by said trigger for regulating the time of engagement of the bell-crank lever with the trigger, and a lug carried by said cable and arranged to engage the other end of said bell-crank lever for actuating the latter.

3. In a blue rock trap, a base, a main frame rotatably mounted thereon on a vertical axis, a carrier frame mounted on said main frame on a horizontal axis, a crank shaft rotatably carried by said carrier frame at one end thereof, an arm secured to said crank shaft, a rock carrier mounted on said arm, a trigger carried by said main frame for holding said arm in operative position, said trigger being provided with a threaded portion having an opening therethrough, a spring for exerting tension on said crank shaft, an operating handle, a cable secured to said operating handle at one end and to said spring at the other, a bell-crank lever pivotally mounted on said main frame, one end of said bell-crank lever being arranged to extend through the opening in said trigger for operating the latter, a lug carried by said cable and arranged to engage the other end of said bell-crank lever for actuating the latter, and adjustable nuts carried by said trigger on the threaded portion thereof for adjusting the time of operation of the trigger by the bell-crank lever.

DANIEL BEST.

Witnesses:
M. D. CHAMBERLIN,
V. H. WILSON.